United States Patent
Ly et al.

(10) Patent No.: US 11,627,572 B2
(45) Date of Patent: Apr. 11, 2023

(54) TRANSPORT BLOCK OVER MULTIPLE SLOTS IN A WIRELESS COMMUNICATION SYSTEM

(71) Applicant: QUALCOMM Incorporated, San Diego, CA (US)

(72) Inventors: Hung Dinh Ly, San Diego, CA (US); Gokul Sridharan, Sunnyvale, CA (US); Peter Gaal, San Diego, CA (US); Nachiket Bapat, San Diego, CA (US); Hari Sankar, San Diego, CA (US); Sanghoon Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/209,087

(22) Filed: Mar. 22, 2021

(65) Prior Publication Data
US 2022/0303983 A1  Sep. 22, 2022

(51) Int. Cl.
*H04W 4/00* (2018.01)
*H04W 72/0446* (2023.01)
*H04W 72/04* (2023.01)
*H04W 72/12* (2023.01)

(52) U.S. Cl.
CPC ..... *H04W 72/0446* (2013.01); *H04W 72/042* (2013.01); *H04W 72/1289* (2013.01)

(58) Field of Classification Search
CPC ........... H04W 72/0446; H04W 72/042; H04W 72/1289
See application file for complete search history.

(56) References Cited

U.S. PATENT DOCUMENTS

| 2003/0085766 | A1* | 5/2003 | Rogerson | ................ H04L 5/26 331/57 |
| 2018/0248674 | A1* | 8/2018 | Bhattad | ............. H04W 72/0466 |
| 2019/0045390 | A1* | 2/2019 | Davydov | .......... H04W 28/0289 |
| 2019/0149365 | A1* | 5/2019 | Chatterjee | ............. H04L 5/0044 370/329 |
| 2020/0112403 | A1* | 4/2020 | Liu | ....................... H04L 1/1812 |
| 2020/0358571 | A1* | 11/2020 | Nimbalker | .......... H04L 27/2602 |
| 2020/0389873 | A1* | 12/2020 | Liu | ....................... H04L 1/1614 |

(Continued)

OTHER PUBLICATIONS

Ericsson: "On PDCCH, PUCCH and PUSCH Enhancements", R1-2101654, 3GPP TSG-RAN WG1 Meeting #104e, R1-2101654, 3rd Generation Partnership Project, Mobile Competence Centre, 650, Route Des Lucioles, F-06921, Sophia-Antipolis Cedex, France, vol. RAN WG1, no. Jan. 26, 2021-Feb. 12, 2021, Jan. 18, 2021, XP051971809, pp. 1-25.

(Continued)

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, information identifying a resource allocation for an uplink transmission of a transport block over multiple slots. The UE may transmit, to the base station, at least a portion of coded bits corresponding to the transport block based at least in part on a different uplink transmission being scheduled within the uplink transmission of the transport block over the multiple slots. Numerous other aspects are described.

30 Claims, 12 Drawing Sheets

(56) References Cited

U.S. PATENT DOCUMENTS

| | | | | |
|---|---|---|---|---|
| 2020/0404655 | A1* | 12/2020 | Salem | H04W 16/14 |
| 2021/0136695 | A1* | 5/2021 | Liu | H04W 72/0413 |
| 2021/0266106 | A1* | 8/2021 | Yan | H04L 1/1822 |
| 2021/0352649 | A1* | 11/2021 | Kim | H04W 72/042 |
| 2021/0400714 | A1* | 12/2021 | Huang | H04L 1/1896 |
| 2022/0007395 | A1* | 1/2022 | Lei | H04L 5/16 |
| 2022/0030620 | A1* | 1/2022 | Cirik | H04W 72/14 |
| 2022/0210802 | A1* | 6/2022 | Hwang | H04L 1/0025 |
| 2022/0225388 | A1* | 7/2022 | You | H04W 72/1289 |
| 2022/0322356 | A1* | 10/2022 | Ly | H04W 72/0493 |
| 2022/0322394 | A1* | 10/2022 | Yi | H04B 1/7143 |
| 2022/0322409 | A1* | 10/2022 | Yokomakura | H04L 5/0051 |

OTHER PUBLICATIONS

International Search Report and Written Opinion—PCT/US2022/070672—ISA/EPO—dated May 24, 2022.
Vivo: "Discussion on PUSCH TB Processing Over Multiple Slots", R1-2100458, 3GPP TSG RAN WG1 #104-e, 3rd Generation Partnership Project, Mobile Competence Centre, 650, Route Des Lucioles, F-06921, Sophia-Antipolis Cedex, France, vol. RAN WG1, no. e-Meeting, Jan. 25, 2021-Feb. 5, 2021, Jan. 18, 2021 (Jan. 18, 2021), XP051970380, 7 Pages.

* cited by examiner

TRANSPORT BLOCK OVER MULTIPLE SLOTS IN A WIRELESS COMMUNICATION SYSTEM

FIELD OF THE DISCLOSURE

Aspects of the present disclosure generally relate to wireless communication and to techniques and apparatuses for communication of a transport block over multiple slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, and one or more processors, coupled to the memory, configured to: receive, from a base station, information identifying a resource allocation for an uplink transmission of a transport block over multiple slots; and transmit, to the base station, at least a portion of coded bits corresponding to the transport block based at least in part on a different uplink transmission being scheduled within the uplink transmission of the transport block over the multiple slots.

In some aspects, a base station for wireless communication includes a memory, and one or more processors, coupled to the memory, configured to: transmit, to a UE, information identifying a resource allocation for an uplink transmission of a transport block over multiple slots; and receive, from the UE, at least a portion of coded bits corresponding to the transport block based at least in part on a different uplink transmission being scheduled within the uplink transmission of the transport block over the multiple slots.

In some aspects, a method of wireless communication performed by a UE includes receiving, from a base station, information identifying a resource allocation for an uplink transmission of a transport block over multiple slots; and transmitting, to the base station, at least a portion of coded bits corresponding to the transport block based at least in part on a different uplink transmission being scheduled within the uplink transmission of the transport block over the multiple slots.

In some aspects, a method of wireless communication performed by a base station includes transmitting, to a UE, information identifying a resource allocation for an uplink transmission of a transport block over multiple slots; and receiving, from the UE, at least a portion of coded bits corresponding to the transport block based at least in part on a different uplink transmission being scheduled within the uplink transmission of the transport block over the multiple slots.

In some aspects, a non-transitory computer-readable medium storing a set of instructions for wireless communication includes one or more instructions that, when executed by one or more processors of a UE, cause the UE to: receive, from a base station, information identifying a resource allocation for an uplink transmission of a transport block over multiple slots; and transmit, to the base station, at least a portion of coded bits corresponding to the transport block based at least in part on a different uplink transmission being scheduled within the uplink transmission of the transport block over the multiple slots.

In some aspects, a non-transitory computer-readable medium storing a set of instructions for wireless communication includes one or more instructions that, when executed by one or more processors of a base station, cause the base station to: transmit, to a UE, information identifying a resource allocation for an uplink transmission of a transport block over multiple slots; and receive, from the UE, at least a portion of coded bits corresponding to the transport block based at least in part on a different uplink transmission being scheduled within the uplink transmission of the transport block over the multiple slots.

In some aspects, an apparatus for wireless communication includes means for receiving, from a base station, information identifying a resource allocation for an uplink transmission of a transport block over multiple slots; and means for transmitting, to the base station, at least a portion of coded bits corresponding to the transport block based at least in part on a different uplink transmission being scheduled within the uplink transmission of the transport block over the multiple slots.

In some aspects, an apparatus for wireless communication includes means for transmitting, to a UE, information identifying a resource allocation for an uplink transmission of a transport block over multiple slots; and means for receiving, from the UE, at least a portion of coded bits corresponding to the transport block based at least in part on a different uplink transmission being scheduled within the uplink transmission of the transport block over the multiple slots.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
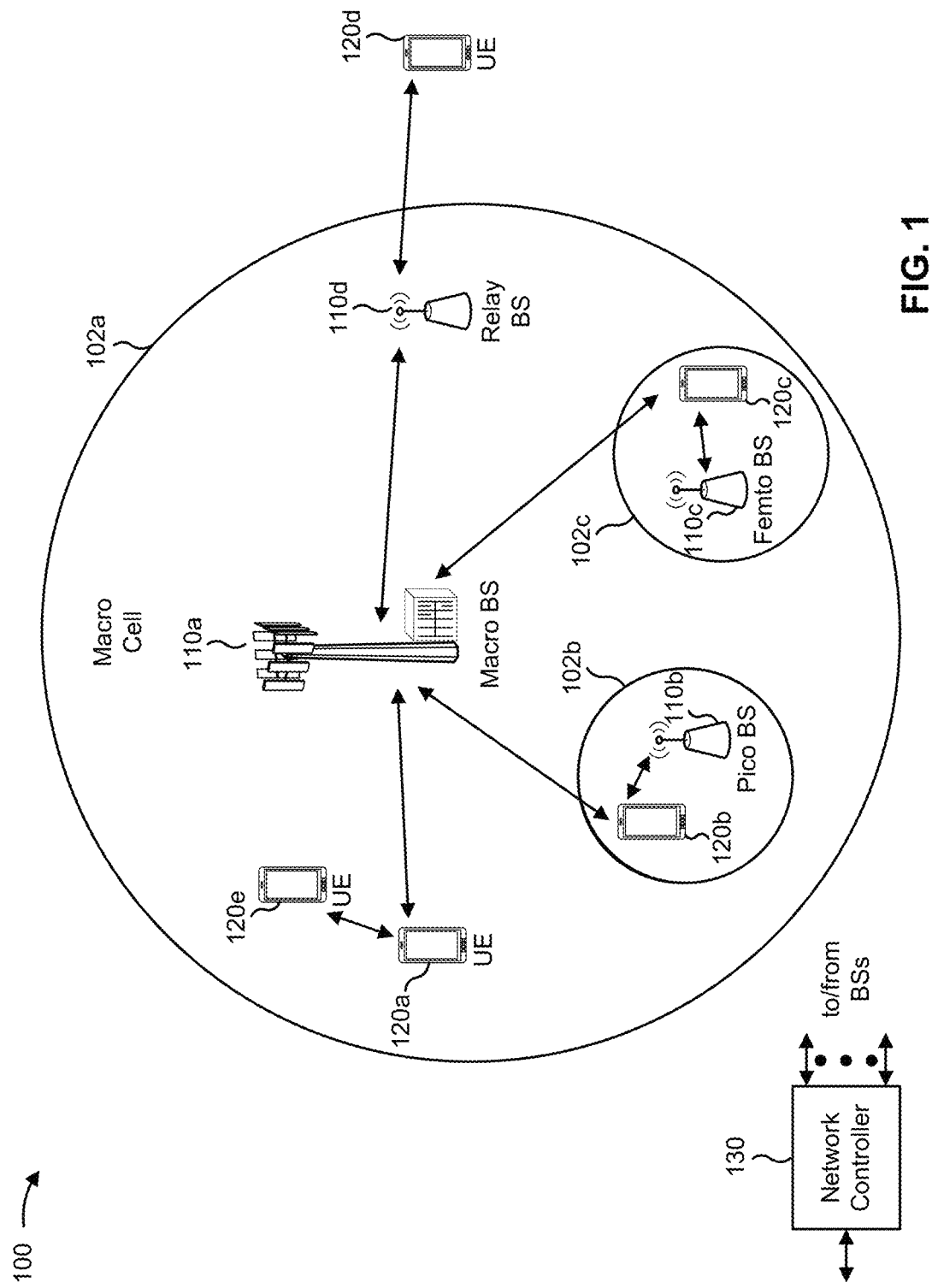
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
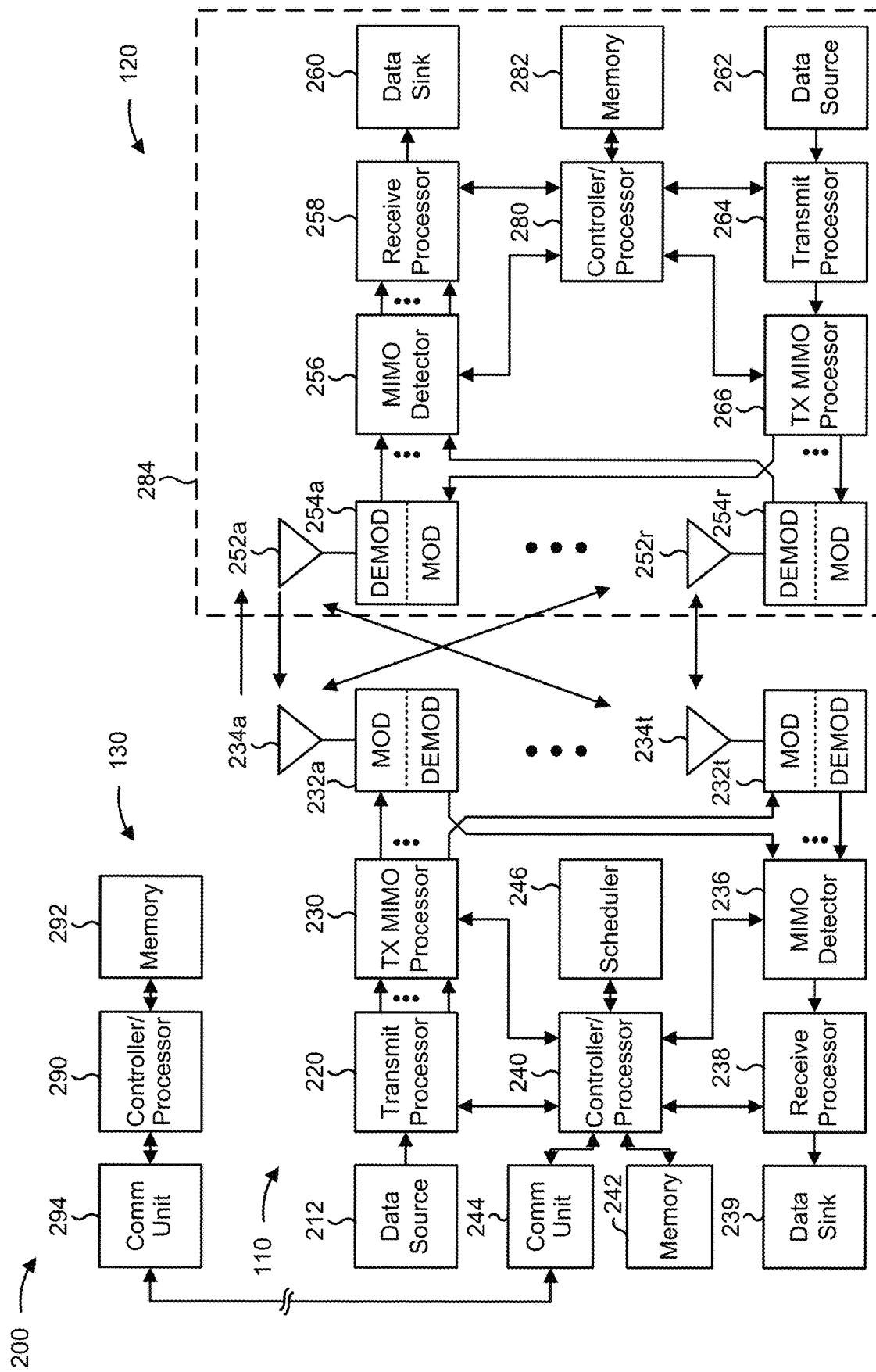
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-10).

Controller/processor 240 of base station 110, controller/processor 280 of UE 120, and/or any other component(s) of FIG. 2 may perform one or more techniques associated with communication of a transport block over multiple slots, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE includes means for receiving, from a base station, information identifying a resource allocation for an uplink transmission of a transport block over multiple slots; and/or means for transmitting, to the base station, at least a portion of coded bits corresponding to the transport block based at least in part on a different uplink transmission being scheduled within the uplink transmission of the transport block over the multiple slots. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, information identifying a resource allocation for an uplink transmission of a transport block over multiple slots; and/or means for receiving, from the UE, at least a portion of coded bits corresponding to the transport block based at least in part on a different uplink transmission being scheduled within the uplink transmission of the transport block over the multiple slots. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
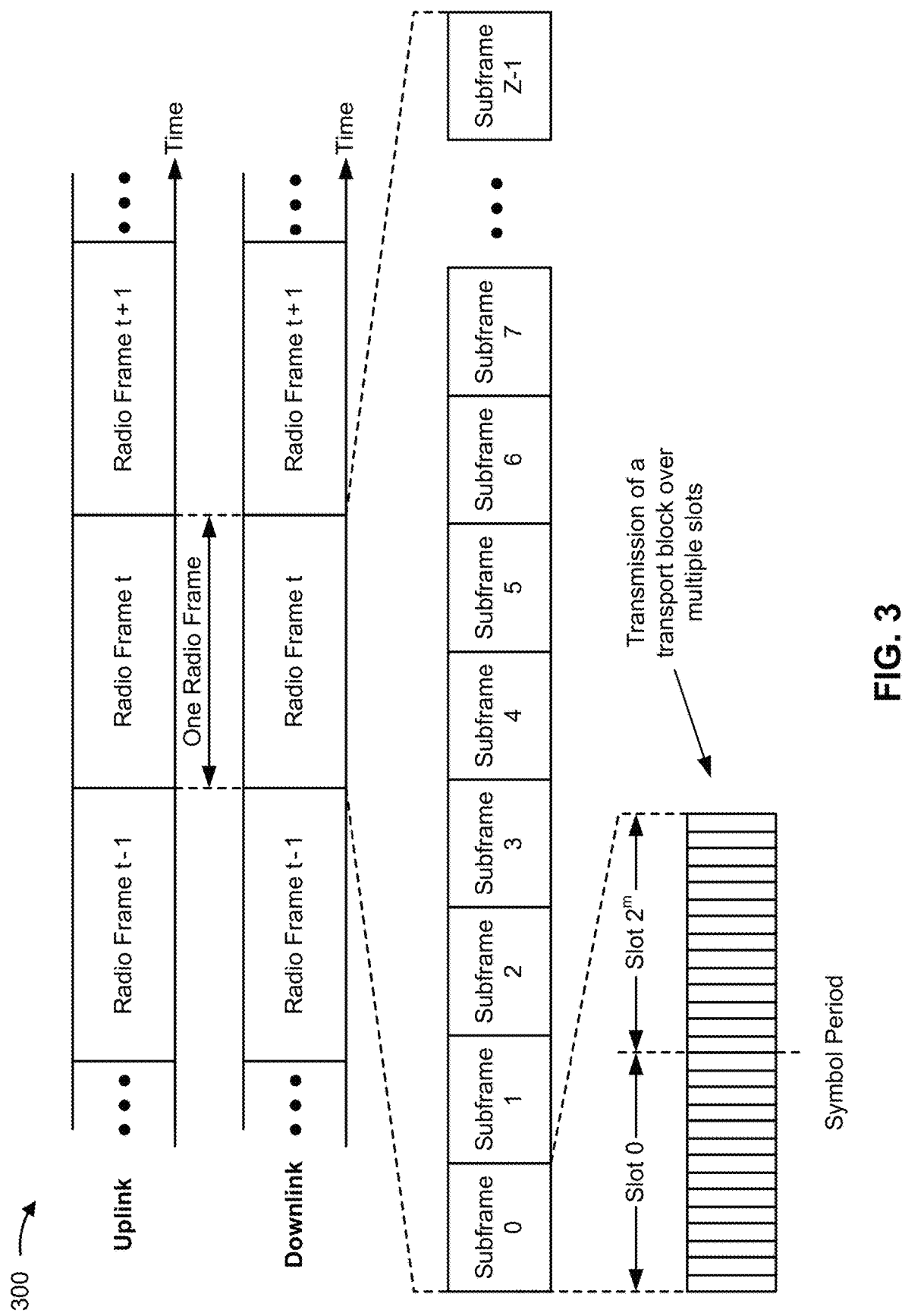
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based. In some aspects, a UE may be scheduled to transmit a transport block over multiple slots.

As indicated above, FIG. 3 is provided as an example. Other examples may differ from what is described with respect to FIG. 3.

Figure 4:
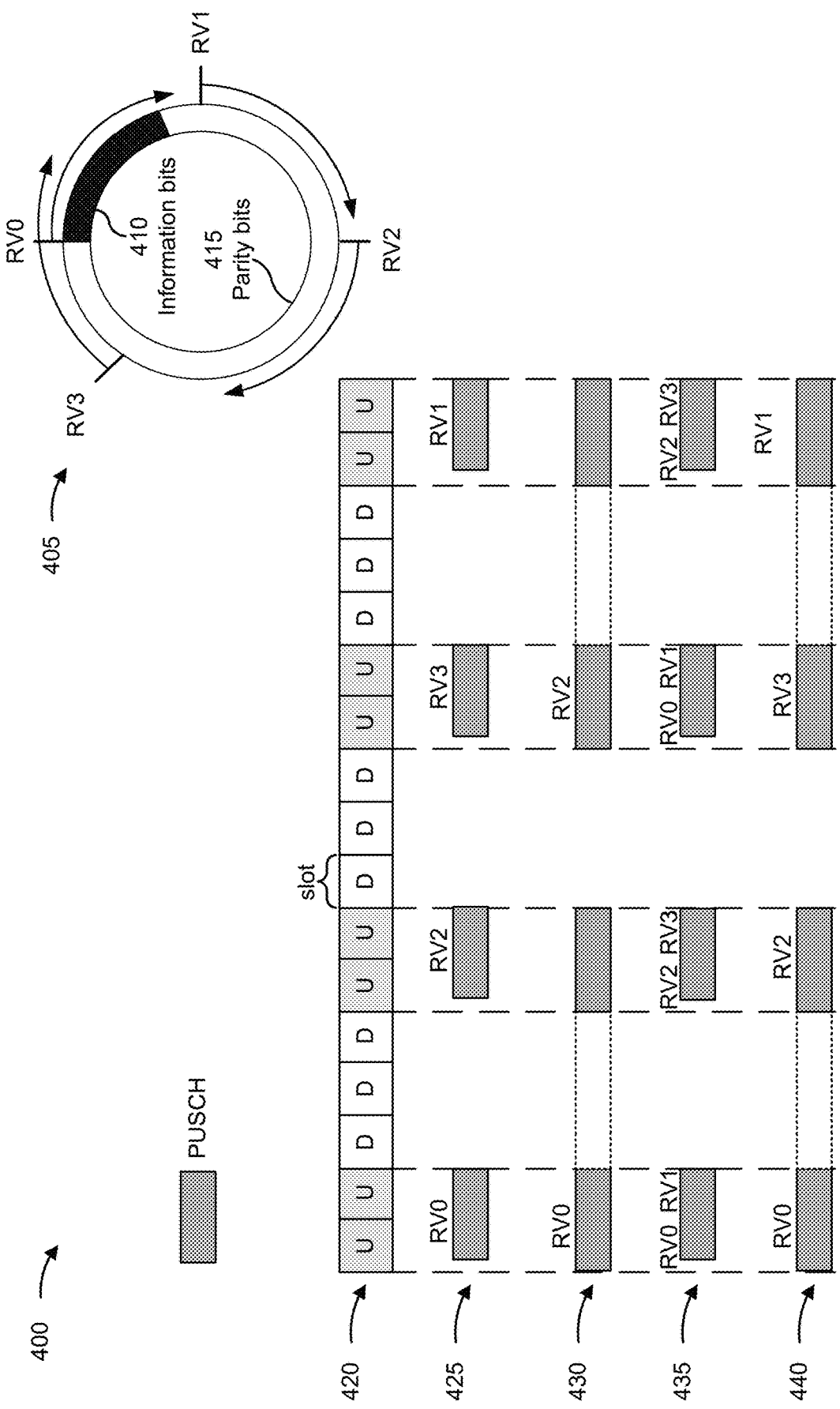
FIG. 4 is a diagram illustrating an example of redundancy version cycling, in accordance with the present disclosure.

FIG. 4 is a diagram illustrating an example 400 of redundancy version cycling, in accordance with the present disclosure. A UE may apply redundancy version cycling to physical uplink shared channel (PUSCH) repetitions to transmit different redundancy versions of the PUSCH repetition in different transmission occasions.

"Redundancy version" (RV) of a PUSCH repetition refers to a set of encoded bits that are transmitted for that PUSCH repetition. Using RV cycling, the UE transmits a different set of encoded bits in different PUSCH repetitions. For example, the UE may store bits for an uplink transmission in a circular buffer 405 (e.g., stored in memory of the UE 120). The circular buffer 405 stores information bits 410 and parity bits 415 (sometimes called parity-check bits). The information bits 410 may include the data to be transmitted, and the parity bits 415 may include linear combinations of the data (e.g., of the information bits 410). The UE may encode information bits 410, parity bits 415, or a combination of information bits 410 and parity bits 415 into a set of encoded bits, and may transmit the set of encoded bits.

The particular bits that are selected to be included in the set of encoded bits for a PUSCH repetition depend on (or are defined by) the RV of that PUSCH repetition. For example, as shown, each RV (RV0, RV1, RV2, and RV3) may correspond to a particular location of the circular buffer.

In some examples, starting bit locations in the circular buffer 405 may be defined by a table stored by the UE. In some examples, a base station may transmit information, such as an RV index, to the UE. For example, the base station may transmit the RV index for a PUSCH communication (e.g., a PUSCH transmission) in downlink control information (DCI) that schedules the PUSCH communication. The RV index may indicate a sequence of RVs to be applied to a corresponding sequence of PUSCH transmission occasions (e.g., PUSCH opportunities). The UE may increment a counter n (sometimes called an index n) for each uplink transmission occasion following (or indicated by) the DCI. The UE may use the information transmitted by the base station 110 (e.g., the RV index) and the value of the counter n for a particular transmission occasion to determine an RV to be applied to that transmission occasion. The RV index may have a value of 0, 1, 2, or 3, each of which corresponds to a different sequence of RVs (e.g., a different order for RV0, RV1, RV2, and RV3).

RV cycling may be used for repetitions in connection with multi-slot transmissions. FIG. 4 also shows an example slot pattern 420 in which sets of two consecutive uplink slots (shown as "U") are separated by a set of downlink slots (shown as "D"). As shown by reference numbers 425 and 435, a set of consecutive uplink slots may be used for a multi-slot PUSCH repetition (e.g., reference numbers 425 and 435 respectively show four repetitions). As shown by reference numbers 430 and 440, multiple sets of consecutive uplink slots may be used for a multi-slot PUSCH repetition (e.g., reference numbers 430 and 440 respectively show two repetitions). In the RV cycling shown by reference numbers 425 and 430, a respective RV may be used for each repetition of a multi-slot transmission. In the RV cycling shown by reference number 435, an RV may be used only over symbols within a single slot. In the RV cycling shown by reference number 440, an RV may be used only over a consecutive set of symbols.

As indicated above, FIG. 4 is provided as an example. Other examples may differ from what is described with respect to FIG. 4.

Figure 5:
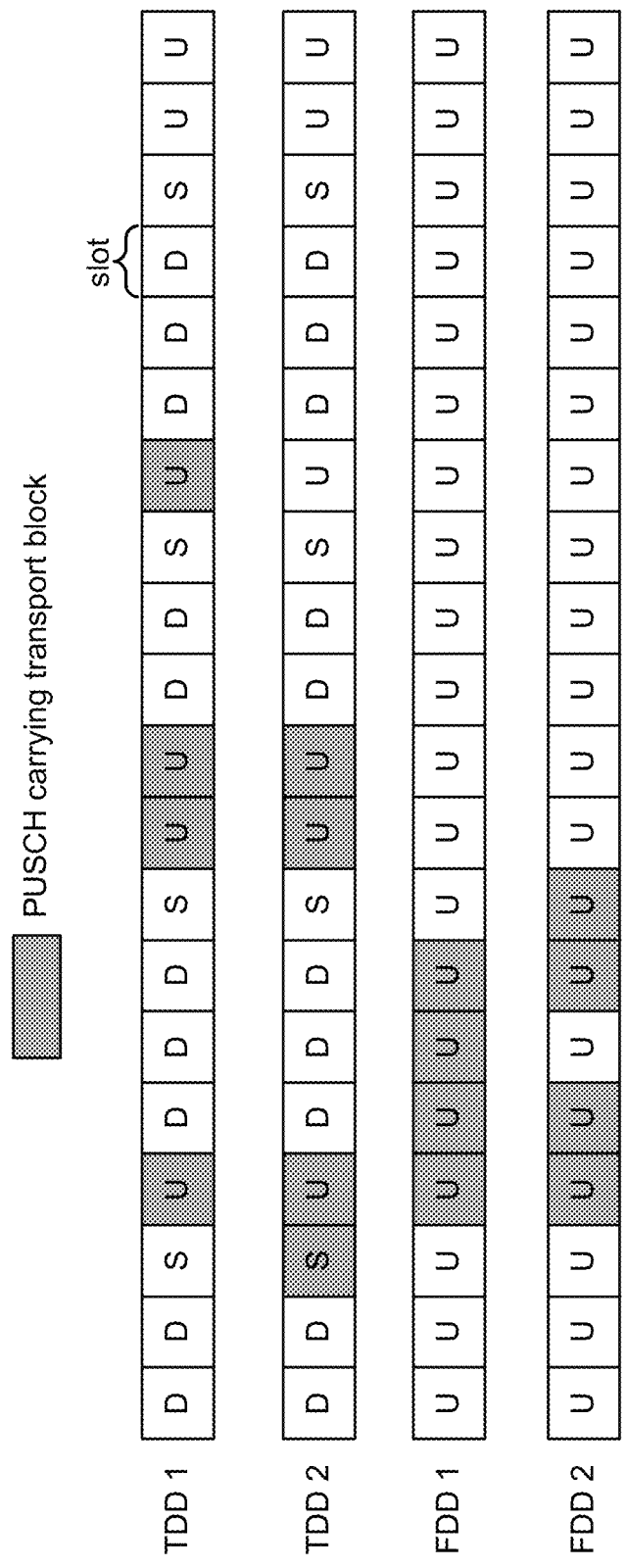
FIG. 5 is a diagram illustrating an example of a transport block over multiple slots in time division duplexing (TDD) and frequency division duplexing (FDD) configurations, in accordance with the present disclosure.

FIG. 5 is a diagram illustrating an example 500 of a transport block over multiple slots in time division duplexing (TDD) and FDD configurations, in accordance with the present disclosure.

In some examples, a UE may transmit a single transport block over multiple slots. That is, the UE may transmit the transport block over a multi-slot PUSCH. The UE may transmit the transport block over multiple slots in a TDD configuration (e.g., in a carrier that uses TDD) and/or in an FDD configuration (e.g., in a carrier that uses FDD). For example, in TDD (e.g., in unpaired spectrum), as shown by example TDD 1, the UE may transmit a transport block over multiple slots assigned for uplink; and/or, as shown by example TDD 2, the UE may transmit a transport block over one or more slots assigned for uplink and/or one or more special slots (shown as "S"). The slots assigned for uplink and/or the special slots may be consecutive or non-consecutive. A special slot may include Nd downlink symbols at the beginning of the slot, Nu uplink symbols at the end of the slot, and Nf flexible symbols (e.g., for downlink or uplink use) between the downlink symbols and the uplink symbols. Nd, Nu and Nf may be configured for the UE semi-statically or dynamically. As another example, in FDD (only uplink shown), as shown by example FDD 1, the UE may transmit a transport block over multiple consecutive slots or, as shown by example FDD 2, over multiple non-consecutive slots.

In some examples, the UE may determine a transport block size for a transport block over multiple slots based at least in part on the multi-slot resource allocation (e.g., four slots as shown). For example, the transport block size may be expanded in accordance with the multi-slot resource allocation. Moreover, the UE may encode a payload (e.g., in accordance with the transport block size), and the UE may transmit the encoded payload in a PUSCH over multiple slots, using a single RV. In some examples, the UE may transmit the transport block in a single transmission occasion (e.g., in a single set of consecutive uplink slots) or in multiple transmission occasions (e.g., in multiple sets of consecutive uplink slots).

As described above, and as shown by examples TDD 1, TDD 2, and FDD 2, the PUSCH transmission of the transport block over multiple slots may be physically non-consecutive. That is, the multiple slots may non-consecutive (e.g., non-contiguous). In some examples, another uplink transmission (e.g., a physical random access channel (PRACH) transmission, a sounding reference signal (SRS) transmission, a physical uplink control channel (PUCCH) transmission, a different PUSCH transmission, or the like) may be scheduled within (e.g., in the middle of) an ongoing transmission of a transport block over multiple slots.

As indicated above, FIG. 5 is provided as an example. Other examples may differ from what is described with respect to FIG. 5.

Figure 6:
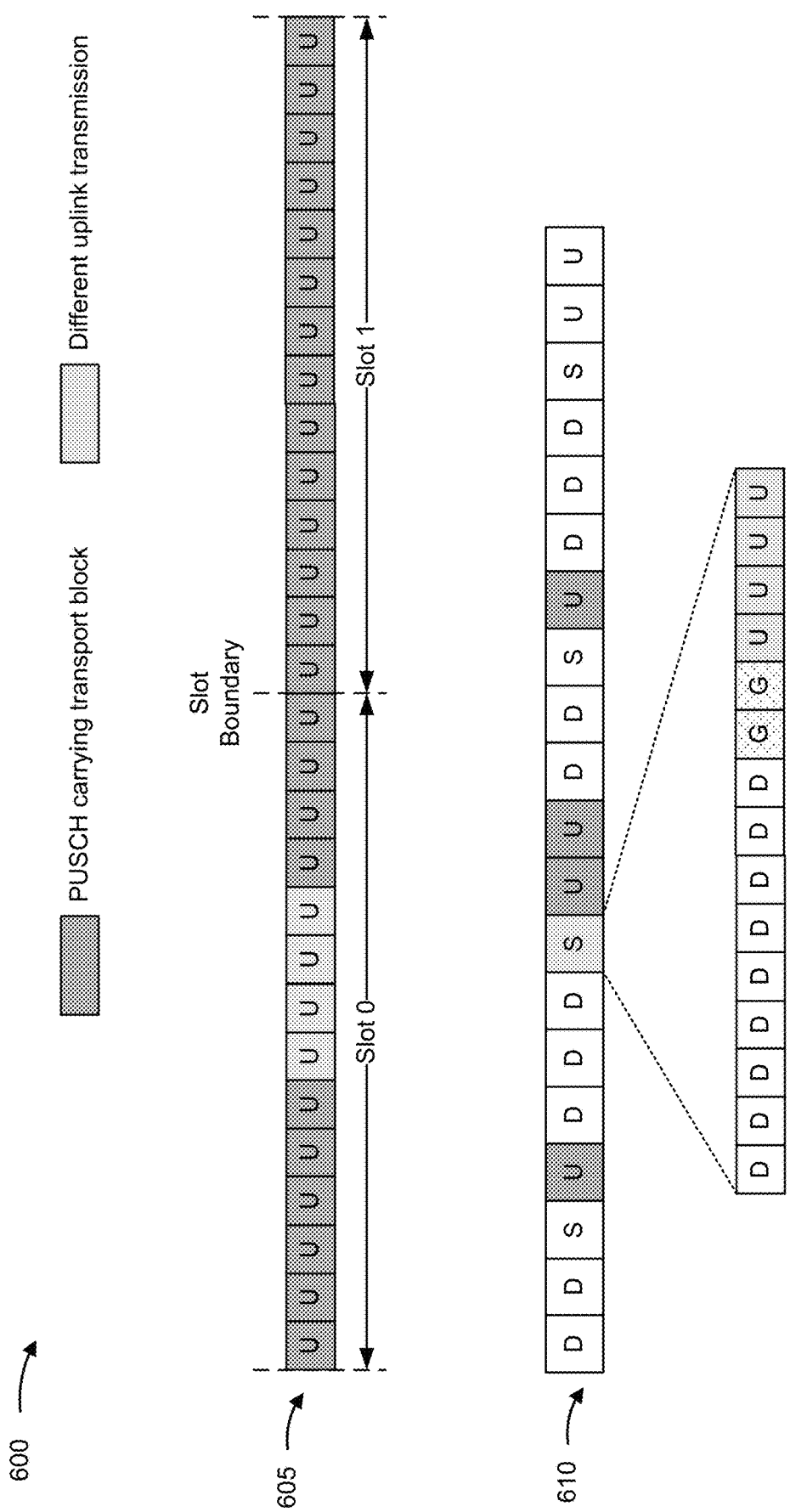
FIG. 6 is a diagram illustrating an example associated with a transport block over multiple slots and an intervening transmission, in accordance with the present disclosure.

FIG. 6 is a diagram illustrating an example 600 of a transport block over multiple slots and an intervening transmission, in accordance with the present disclosure. As shown by reference number 605, a UE may transmit a transport block over multiple consecutive slots (e.g., Slot 0 and Slot 1, as shown). For example, symbols in Slot 0 and Slot 1 may be allocated for a multi-slot PUSCH transmission of a transport block. As further shown by reference number 605, the UE may be scheduled with a different uplink transmission (e.g., an SRS transmission, a PUCCH transmission, a PUSCH transmission, PRACH transmission, or the like), within the multi-slot PUSCH transmission of the transport block, that has a higher priority than the multi-slot PUSCH transmission. For example, the different uplink transmission with higher priority may be a PUSCH for enhanced mobile broadband (eMBB) or a PUSCH for voice over Internet protocol (VoIP).

In some cases, after transmitting the different uplink transmission the UE may not be enabled to determine whether to continue transmission of the transport block in a remaining portion of a slot (e.g., a remaining portion of Slot 0, as shown) and/or in a subsequent slot (e.g., Slot 1, as shown). Moreover, it is difficult for the UE to handle the different uplink transmission within the multi-slot PUSCH transmission because the UE may need to switch between different transmission states, which consumes excessive processing resources and/or memory resources of the UE.

As shown by reference number 610, a UE may transmit a transport block over multiple non-consecutive slots. As further shown by reference number 610, the UE may be scheduled with a different uplink transmission, within the multi-slot PUSCH transmission of the transport block, that has a higher priority than the multi-slot PUSCH transmission, as described above. For example, as shown, the different uplink transmission may be scheduled in uplink symbols of a special slot (e.g., which also includes downlink symbols and a guard interval, shown as "G," between the downlink symbols and the uplink symbols). Here, the uplink symbols may be allocated for the multi-slot PUSCH transmission of the transport block, or the uplink symbols may be unallocated (e.g., empty). As described above, it is difficult for the UE to handle the different uplink transmission within the multi-slot PUSCH transmission because the UE may need to switch between different transmission states, which consumes excessive processing resources and/or memory resources of the UE.

Described herein are techniques and apparatuses for handling of an uplink transmission of a transport block over multiple slots and a different uplink transmission that is scheduled within the uplink transmission of the transport block over the multiple slots. In this way, a UE can resolve conflicts between the uplink transmission of the transport block and the different uplink transmission, reduce transmission state switching, conserve processing resources and/or memory resources, or the like.

As indicated above, FIG. 6 is provided as an example. Other examples may differ from what is described with respect to FIG. 6.

Figure 7:
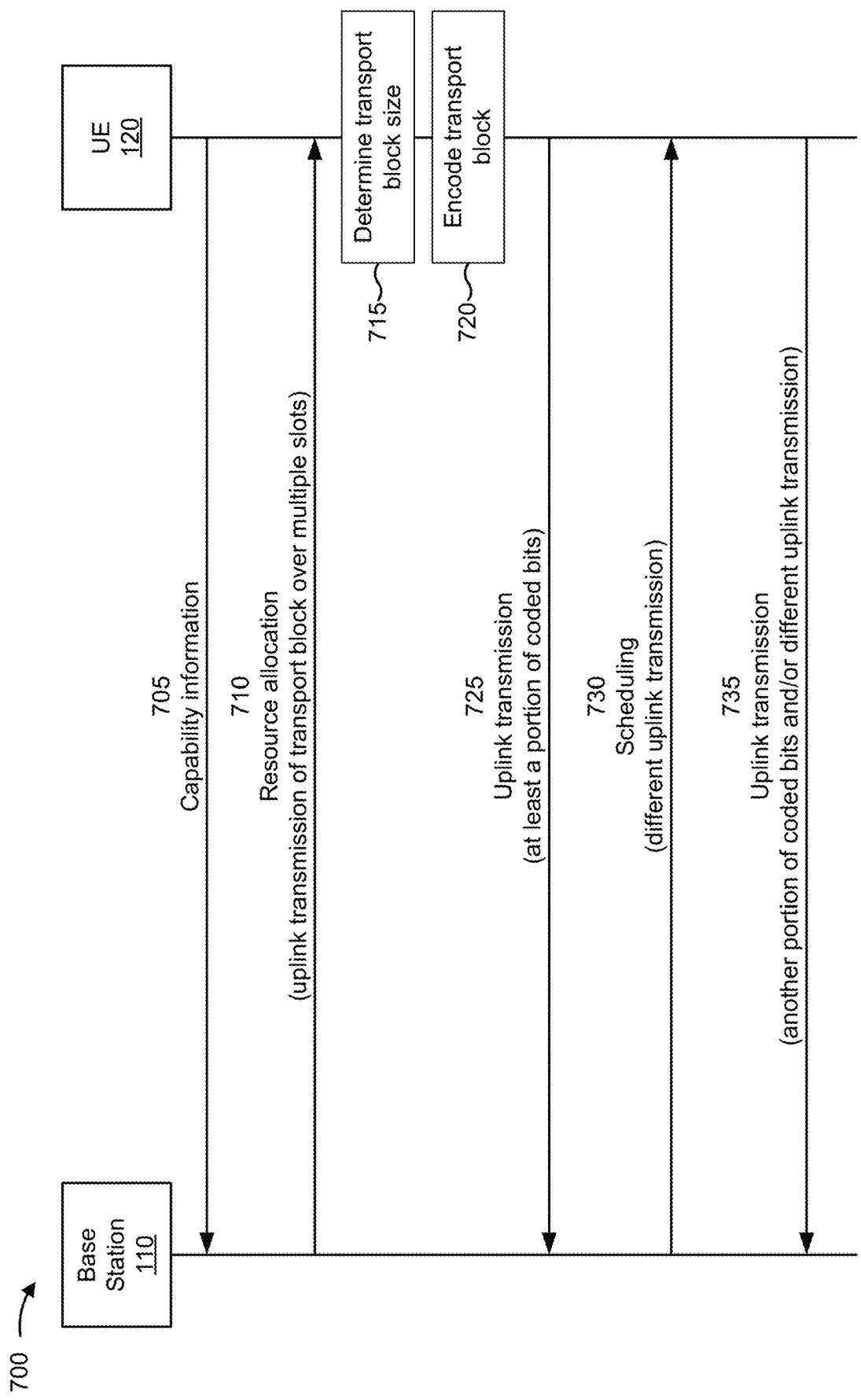
FIGS. 7-8 are diagrams illustrating examples associated with a transport block over multiple slots, in accordance with the present disclosure.

FIG. 7 is a diagram illustrating an example 700 associated with a transport block over multiple slots, in accordance with the present disclosure. As shown in FIG. 7, example 700 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown by reference number 705, the UE 120 may transmit, and the base station 110 may receive, capability information (e.g., UE capability information). The capability information may indicate whether the UE 120 supports transmitting an uplink transmission (e.g., an intervening uplink transmission) within (e.g., in the middle of) an uplink transmission of a transport block over multiple slots. For example, the capability information may indicate (or may not indicate) that the UE 120 supports transmitting an uplink transmission within an uplink transmission of a transport block over multiple slots. In some aspects, the capability information may indicate a minimum time gap (e.g., a quantity of symbols) supported by the UE 120 for switching between an uplink transmission of a transport block over multiple slots and an intervening uplink transmission.

In some aspects, the capability information may be at a UE level. That is, the capability information may be per UE. In some aspects, the capability information may indicate, per frequency band, whether the UE 120 supports transmitting an uplink transmission within an uplink transmission of a transport block over multiple slots and/or a minimum time gap supported by the UE 120.

As shown by reference number 710, the base station 110 may transmit, and the UE 120 may receive, information identifying a resource allocation. For example, the information identifying the resource allocation may include DCI that indicates an uplink grant (e.g., a dynamic grant). As another example, the information identifying the resource allocation may include a configuration for an uplink configured grant.

The resource allocation may be for an uplink transmission of a transport block over multiple slots (or over multiple time intervals greater than a symbol). That is, the resource allocation may include multiple slots for the transmission of the transport block. In some aspects, the transport block may be associated with a single RV used for PUSCH repetition. In some aspects, the multiple slots may include a single uplink transmission occasion or the multiple slots may include multiple uplink transmission occasions. In some aspects, the multiple slots may be associated with a TDD configuration or an FDD configuration, as described above.

As shown by reference number 715, the UE 120 may determine (e.g., compute) a transport block size for the uplink transmission of the transport block. The UE 120 may determine the transport block size based at least in part on the resource allocation. That is, the UE 120 may determine the transport block size based at least in part on the quantity of the multiple slots for the uplink transmission of the transport block. As shown by reference number 720, the UE 120 may encode the transport block based at least in part the transport block size. Accordingly, the UE 120 may obtain coded bits corresponding to the transport block.

As shown by reference number 725, the UE 120 may transmit, and the base station 110 may receive, an uplink transmission. For example, the UE 120 may transmit at least a portion (e.g., a beginning portion) of the coded bits corresponding to the transport block using the resource allocation. That is, the UE 120 may transmit at least a portion (e.g., a beginning portion) of the uplink transmission of the transport block using the resource allocation. In some aspects, the UE 120 may transmit the portion of the coded bits corresponding to the transport block (e.g., the portion of the uplink transmission of the transport block) before a time at which a different uplink transmission is scheduled, as described below.

As shown by reference number 730, the base station 110 may transmit, and the UE 120 may receive, information scheduling a different uplink transmission for the UE 120 (e.g., the UE 120 may receive another resource allocation). For example, the information scheduling the different uplink transmission may include DCI that indicates an uplink grant for the different uplink transmission. In some aspects, a PUSCH for the uplink transmission of the transport block and a channel for the different uplink transmission may be associated with different sub-carrier spacings.

The different uplink transmission may be another PUSCH transmission, a PUCCH transmission, an SRS transmission, or a PRACH transmission, among other examples. The different uplink transmission may be a higher-priority transmission than the uplink transmission of the transport block over the multiple slots. In other words, the base station 110 may transmit the information scheduling the different uplink transmission based at least in part on a determination that the different uplink transmission has a higher priority than the uplink transmission of the transport block.

The different uplink transmission may be scheduled within (e.g., in the middle of) the uplink transmission of the transport block over the multiple slots. For example, the different uplink transmission may be scheduled in one or more slots that are between uplink transmission occasions for the transport block over the multiple slots. In other words, the one or more slots may not be allocated (e.g., by the resource allocation) for the uplink transmission of the transport block, but the one or more slots may be between slots that are allocated (e.g., by the resource allocation) for the uplink transmission of the transport block. As another example, the different uplink transmission may be scheduled in one or more slots that overlap with at least one slot allocated (e.g., by the resource allocation) for the uplink transmission of the transport block. In some aspects, the UE 120 may receive the information scheduling the different uplink transmission during (e.g., after beginning) the uplink transmission of the transport block over the multiple slots or prior to initiating the uplink transmission of the transport block over the multiple slots.

In some aspects, the different uplink transmission within the uplink transmission of the transport block over the multiple slots is not permitted. For example, there can be no intervening uplink transmission within the uplink transmission of the transport block over the multiple slots (e.g., according to a rule). In some aspects, the different uplink transmission being scheduled within the uplink transmission of the transport block over the multiple slots may result in a configuration error (e.g., an error case). For example, the different uplink transmission being scheduled within the uplink transmission of the transport block over the multiple slots may result in the configuration error if the UE 120 did not indicate (e.g., in the capability information) support for transmitting an uplink transmission within an uplink transmission of a transport block over multiple slots. In other words, the UE 120 does not expect to be scheduled with the different uplink transmission within the uplink transmission of the transport block over the multiple slots (e.g., if the UE 120 did not indicate support for transmitting an uplink transmission within an uplink transmission of a transport block over multiple slots).

As shown by reference number 735, the UE 120 may transmit, and the base station 110 may receive, an uplink transmission. For example, the UE 120 may transmit another portion of the coded bits corresponding to the transport block (e.g., another portion of the uplink transmission of the transport block) and/or the different uplink transmission scheduled for the UE 120. That is, in connection with transmitting at least the portion of the coded bits corresponding to the transport block (as described above in connection with reference number 725), the UE 120 may transmit the other portion of the coded bits corresponding to the transport block and/or the different uplink transmission.

In some aspects (e.g., when transmitting at least the portion of the coded bits corresponding to the transport block), the UE 120 may transmit all of the coded bits corresponding to the transport block (e.g., the entire uplink transmission of the transport block) over the multiple slots, and the UE 120 may refrain from transmitting the different uplink transmission. That is, the UE 120 may drop the different uplink transmission, and the UE 120 may transmit the entire uplink transmission of the transport block over the multiple slots.

In some aspects, the UE 120 may transmit (e.g., before the different uplink transmission) the portion (e.g., the beginning portion) of the coded bits corresponding to the transport block (e.g., the beginning portion of the uplink transmission of the transport block); the UE 120 may transmit the different uplink transmission; and the UE 120 may refrain from transmitting (e.g., after the different uplink transmission) another portion (e.g., an ending portion) of the coded bits corresponding to the transport block (e.g., an ending portion of the uplink transmission of the transport block). That is, the UE 120 may drop the other portion (e.g., the ending portion) of the uplink transmission of the transport block.

In some aspects, the other portion of the coded bits corresponding to the transport block is a remaining portion of the coded bits (e.g., a remaining portion of the uplink transmission of the transport block), following the different uplink transmission, that is in the same slot as the different uplink transmission. Thus, after transmitting the different uplink transmission, the UE 120 may transmit (e.g., without transmitting a remaining portion of the coded bits that are in the same slot as the different uplink transmission) a remaining portion of the coded bits corresponding to the transport block in a subsequent slot. In some aspects, the other portion of the coded bits corresponding to the transport block is a remaining portion (e.g., an entire remaining portion) of the coded bits (e.g., an entire remaining portion of the uplink transmission of the transport block) following the different uplink transmission (e.g., regardless of whether the remaining portion is in the same slot, or in a subsequent slot, as the different uplink transmission).

In some aspects, the UE 120 may transmit (e.g., before the different uplink transmission) the portion (e.g., the beginning portion) of the coded bits corresponding to the transport block (e.g., the beginning portion of the uplink transmission of the transport block); the UE 120 may transmit the different uplink transmission; and the UE 120 may refrain from transmitting another portion of the coded bits corresponding to the transport block (e.g., another portion of the uplink transmission of the transport block) that overlaps with the different uplink transmission. That is, the UE 120 may drop the other portion of the uplink transmission of the transport block that overlaps with the different uplink transmission. Thus, after transmitting the different uplink transmission, the UE 120 may transmit a remaining portion of the coded bits corresponding to the transport block (e.g., a remaining portion of the uplink transmission of the transport block) that does not overlap with the different uplink transmission.

In some aspects (e.g., when transmitting at least the portion of the coded bits corresponding to the transport block), the UE 120 may transmit a first portion of the coded bits corresponding to the transport block (e.g., a first portion of the uplink transmission of the transport block) before transmitting the different uplink transmission, and the UE 120 may transmit a second portion of the coded bits corresponding to the transport block (e.g., a second portion of the uplink transmission of the transport block) after transmitting the different uplink transmission, as described above. In some aspects, the UE 120 may transmit, and the base station 110 may receive, the first portion and the second portion without phase continuity of the first portion and the second portion (e.g., the first portion and the second portion may be associated with different phases). In other words, the base station 110 and the UE 120 do not expect (e.g., when the UE 120 is configured for joint channel estimation across multiple PUSCH transmissions) the UE 120 to transmit the first portion and the second portion with phase continuity maintained. In this way, the UE 120 may reduce transmission state switching, thereby conserving processing resources and/or memory resources, or the like.

As indicated above, FIG. 7 is provided as an example. Other examples may differ from what is described with respect to FIG. 7.

Figure 8:
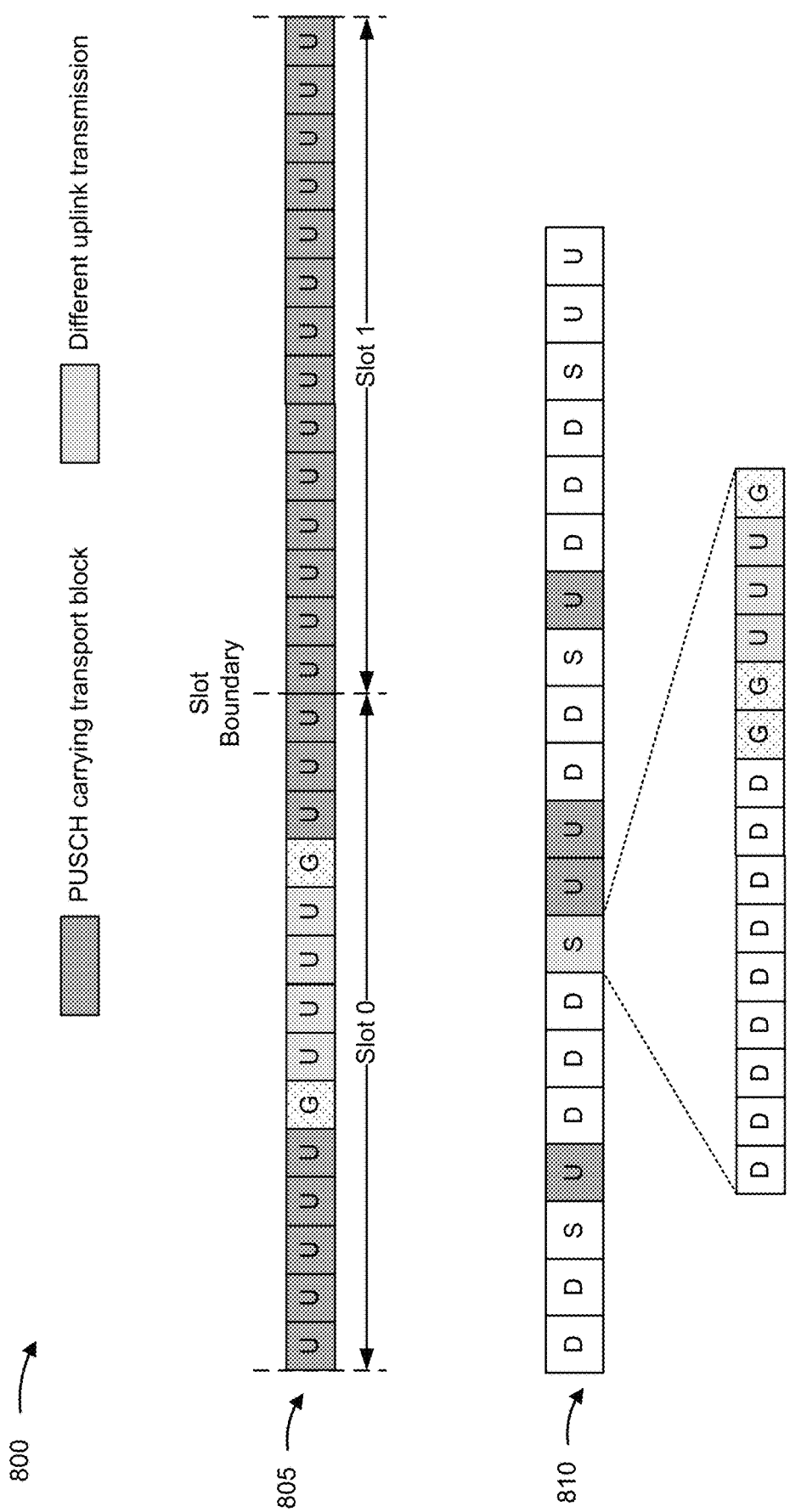

FIG. 8 is a diagram illustrating an example 800 associated with a transport block over multiple slots, in accordance with the present disclosure. Example 800 may include communication between the base station 110 and the UE 120, as described above in connection with FIG. 7. For example, the UE 120 may transmit at least the portion of the uplink transmission of the transport block and/or the different uplink transmission, as described above in connection with reference numbers 725 and 735 of example 700.

As shown by reference number 805, the UE 120 may transmit the uplink transmission of the transport block (e.g., the coded bits corresponding to the transport block) over the multiple slots and the different uplink transmission separated by one or more time gaps (e.g., one or more guard intervals). That is, the different uplink transmission may be scheduled within the uplink transmission of the transport block provided that there are time gaps between the different uplink transmission and the uplink transmission of the transport block. For example, as shown, a first time gap may be between a first portion of the uplink transmission of the transport block (e.g., a first portion of the coded bits corresponding to the transport block) and a beginning of the different uplink transmission, and a second time gap may be between an end of the different uplink transmission and a second portion of the uplink transmission of the transport block (e.g., a second portion of the coded bits corresponding to the transport block).

In some aspects, a time gap may have a duration of one or more symbols. In some aspects, as shown by reference number 810, one or more symbols of a time gap may be at the end of a slot in which the different uplink transmission is transmitted (e.g., if the subsequent slot includes the uplink transmission of the transport block). Additionally, or alternatively, one or more symbols of a time gap may be at the beginning of a slot in which the uplink transmission of the transport block is transmitted (e.g., if the preceding slot includes the different uplink transmission). In some aspects, one or more symbols of a time gap may be at the beginning of a slot in which the different uplink transmission is transmitted (e.g., if the preceding slot includes the uplink transmission of the transport block) and/or one or more symbols of a time gap may be at the end of a slot in which the uplink transmission of the transport block is transmitted (e.g., if the subsequent slot includes the different uplink transmission).

In some aspects, a duration of a time gap may be based at least in part on a first sub-carrier spacing (SCS) associated with a PUSCH for the uplink transmission of the transport block and/or a second SCS associated with a channel (e.g., a PRACH, a PUCCH, a PUSCH, or the like) for the different uplink transmission. For example, the duration of the time gap may be based at least in part on a minimum SCS of the first SCS and the second SCS, a maximum SCS of the first SCS and the second SCS, or the like. In some aspects, a time gap may have a fixed duration (e.g., a fixed duration of one symbol). In some aspects, the base station 110 may transmit (e.g., via radio resource control (RRC) signaling, system information, or the like), and the UE 120 may receive, information that identifies a duration for a time gap. In some aspects, a duration for a time gap may be based at least in part on a capability of the UE 120 (e.g., indicated in the capability information). For example, the capability of the UE 120 may indicate a minimum duration for a time gap (e.g., a quantity of symbols) supported by the UE 120 for switching between an uplink transmission of a transport block over multiple slots and an intervening uplink transmission, as described above. Accordingly, a duration for a time gap may be at least the minimum duration for the time gap supported by the UE 120. In this way, a time gap provides time for the UE 120 to switch (e.g., switch transmission states) between the uplink transmission of the transport block over multiple slots and the different uplink transmission.

As indicated above, FIG. 8 is provided as an example. Other examples may differ from what is described with respect to FIG. 8.

Figure 9:
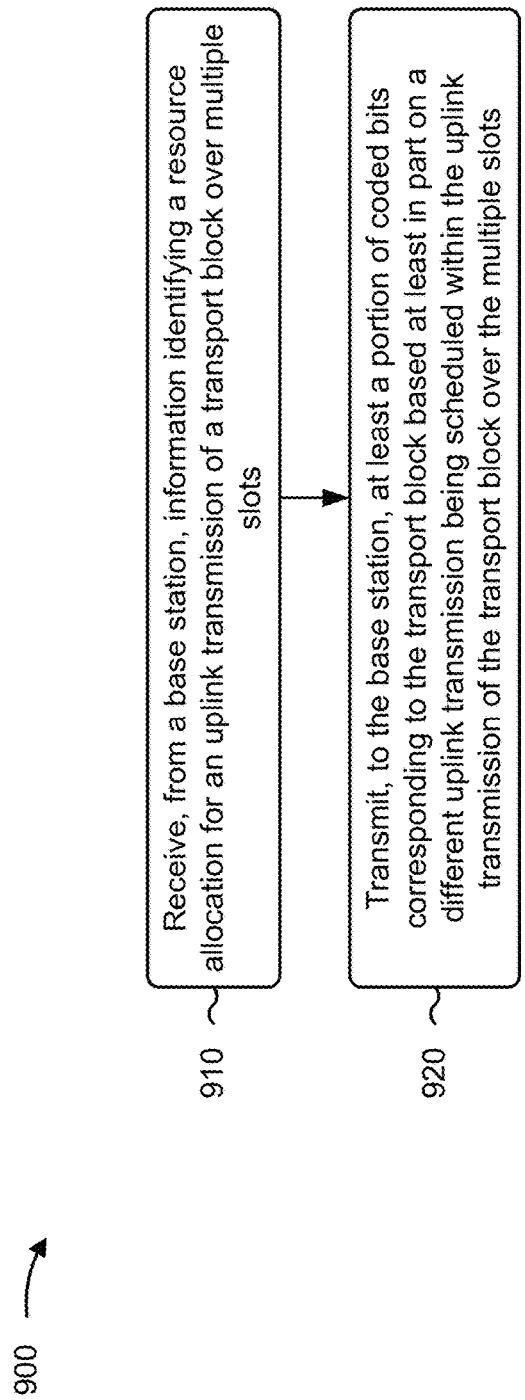
FIGS. 9-10 are diagrams illustrating example processes associated with a transport block over multiple slots, in accordance with the present disclosure.

FIG. 9 is a diagram illustrating an example process 900 performed, for example, by a UE, in accordance with the present disclosure. Example process 900 is an example where the UE (e.g., UE 120) performs operations associated with a transport block over multiple slots.

As shown in FIG. 9, in some aspects, process 900 may include receiving, from a base station, information identifying a resource allocation for an uplink transmission of a transport block over multiple slots (block 910). For example, the UE (e.g., using reception component 1102, depicted in FIG. 11) may receive, from a base station, information identifying a resource allocation for an uplink transmission of a transport block over multiple slots, as described above.

As further shown in FIG. 9, in some aspects, process 900 may include transmitting, to the base station, at least a portion of coded bits corresponding to the transport block based at least in part on a different uplink transmission being scheduled within the uplink transmission of the transport block over the multiple slots (block 920). For example, the UE (e.g., using transmission component 1104, depicted in FIG. 11) may transmit, to the base station, at least a portion of coded bits corresponding to the transport block based at least in part on a different uplink transmission being scheduled within the uplink transmission of the transport block over the multiple slots, as described above.

Process 900 may include additional aspects, such as any single aspect or any combination of aspects described below and/or in connection with one or more other processes described elsewhere herein.

In a first aspect, process 900 includes determining (e.g., using determination component 1108, depicted in FIG. 11) a transport block size based at least in part on the resource allocation, and encoding (e.g., using transmission component 1104, depicted in FIG. 11) the transport block based at least in part on the transport block size.

In a second aspect, alone or in combination with the first aspect, process 900 includes transmitting (e.g., using transmission component 1104, depicted in FIG. 11) capability information indicating whether the UE supports transmitting the different uplink transmission within the uplink transmission of the transport block over the multiple slots.

In a third aspect, alone or in combination with one or more of the first and second aspects, the capability information indicates, per frequency band, whether the UE supports transmitting the different uplink transmission within the uplink transmission of the transport block over the multiple slots.

In a fourth aspect, alone or in combination with one or more of the first through third aspects, the different uplink transmission being scheduled within the uplink transmission of the transport block over the multiple slots results in a configuration error.

In a fifth aspect, alone or in combination with one or more of the first through fourth aspects, transmitting at least the portion of the coded bits corresponding to the transport block includes transmitting the coded bits corresponding to the transport block over the multiple slots and refraining from transmitting the different uplink transmission.

In a sixth aspect, alone or in combination with one or more of the first through fifth aspects, transmitting at least the portion of the coded bits corresponding to the transport block includes transmitting the different uplink transmission and refraining from transmitting another portion of the coded bits corresponding to the transport block.

In a seventh aspect, alone or in combination with one or more of the first through sixth aspects, the other portion of the coded bits corresponding to the transport block is a remaining portion of the coded bits corresponding to the transport block, following the different uplink transmission, that is in a same slot as the different uplink transmission.

In an eighth aspect, alone or in combination with one or more of the first through seventh aspects, the other portion of the coded bits corresponding to the transport block is a remaining portion of the coded bits corresponding to the transport block following the different uplink transmission.

In a ninth aspect, alone or in combination with one or more of the first through eighth aspects, transmitting at least the portion of the coded bits corresponding to the transport block includes transmitting the different uplink transmission and refraining from transmitting another portion of the coded bits corresponding to the transport block that overlaps with the different uplink transmission.

In a tenth aspect, alone or in combination with one or more of the first through ninth aspects, the uplink transmission of the transport block over the multiple slots and the different uplink transmission are separated by a time gap.

In an eleventh aspect, alone or in combination with one or more of the first through tenth aspects, a duration of the time gap is based at least in part on at least one of a sub-carrier spacing associated with the uplink transmission of the transport block over the multiple slots or a sub-carrier spacing associated with the different uplink transmission.

In a twelfth aspect, alone or in combination with one or more of the first through eleventh aspects, the time gap has a fixed duration.

In a thirteenth aspect, alone or in combination with one or more of the first through twelfth aspects, process 900 includes receiving (e.g., using reception component 1102, depicted in FIG. 11) information identifying a duration for the time gap.

In a fourteenth aspect, alone or in combination with one or more of the first through thirteenth aspects, a duration of the time gap is based at least in part on a capability of the UE.

In a fifteenth aspect, alone or in combination with one or more of the first through fourteenth aspects, transmitting at least the portion of the coded bits corresponding to the transport block includes transmitting a first portion of the coded bits corresponding to the transport block before the different uplink transmission and a second portion of the coded bits corresponding to the transport block after the different uplink transmission without phase continuity of the first portion and the second portion.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
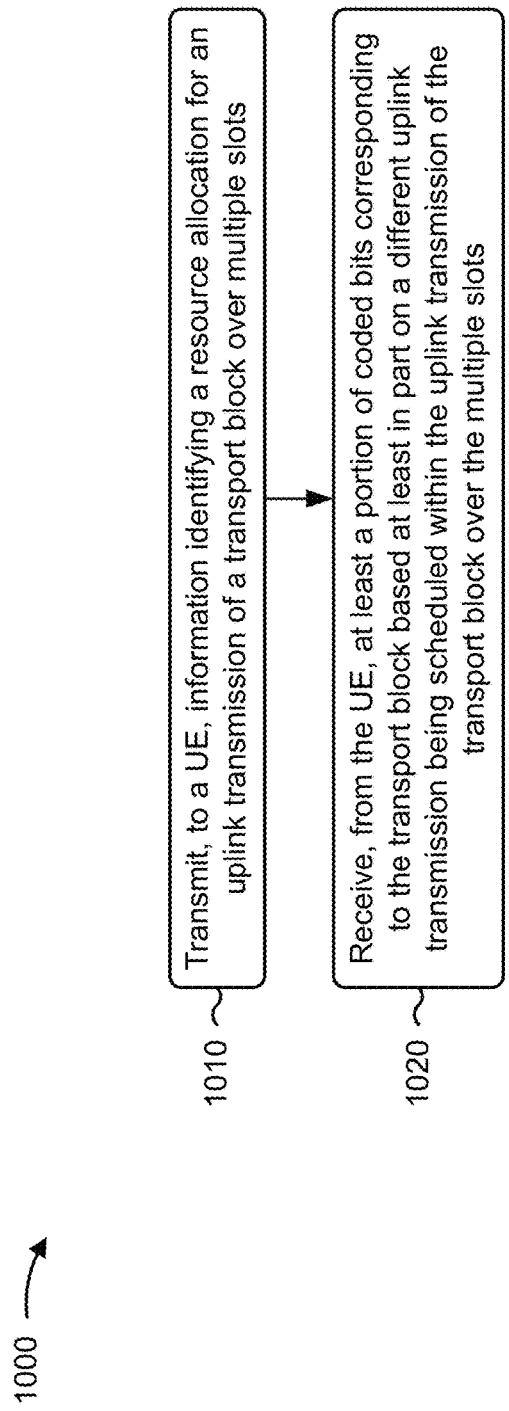

FIG. 10 is a diagram illustrating an example process 1000 performed, for example, by a base station, in accordance with the present disclosure. Example process 1000 is an example where the base station (e.g., base station 110) performs operations associated with a transport block over multiple slots.

As shown in FIG. 10, in some aspects, process 1000 may include transmitting, to a UE, information identifying a resource allocation for an uplink transmission of a transport block over multiple slots (block 1010). For example, the base station (e.g., using transmission component 1204, depicted in FIG. 12) may transmit, to a UE, information identifying a resource allocation for an uplink transmission of a transport block over multiple slots, as described above.

As further shown in FIG. 10, in some aspects, process 1000 may include receiving, from the UE, at least a portion of coded bits corresponding to the transport block based at least in part on a different uplink transmission being scheduled within the uplink transmission of the transport block over the multiple slots (block 1020). For example, the base station (e.g., using reception component 1202, depicted in FIG. 12) may receive, from the UE, at least a portion of coded bits corresponding to the transport block based at least in part on a different uplink transmission being scheduled within the uplink transmission of the transport block over the multiple slots, as described above.

Process 1000 may include additional aspects, such as any single aspect or any combination of aspects described below and/or in connection with one or more other processes described elsewhere herein.

In a first aspect, process 1000 includes receiving (e.g., using reception component 1202, depicted in FIG. 12) capability information indicating whether the UE supports transmitting the different uplink transmission within the uplink transmission of the transport block over the multiple slots.

In a second aspect, alone or in combination with the first aspect, the capability information indicates, per frequency band, whether the UE supports transmitting the different uplink transmission within the uplink transmission of the transport block over the multiple slots.

In a third aspect, alone or in combination with one or more of the first and second aspects, the different uplink transmission being scheduled within the uplink transmission of the transport block over the multiple slots results in a configuration error.

In a fourth aspect, alone or in combination with one or more of the first through third aspects, receiving at least the portion of the coded bits corresponding to the transport block includes receiving the coded bits corresponding to the transport block over the multiple slots without receiving the different uplink transmission.

In a fifth aspect, alone or in combination with one or more of the first through fourth aspects, receiving at least the portion of the coded bits corresponding to the transport block includes receiving the different uplink transmission without receiving another portion of the coded bits corresponding to the transport block.

In a sixth aspect, alone or in combination with one or more of the first through fifth aspects, the other portion of the coded bits corresponding to the transport block is a remaining portion of the coded bits corresponding to the transport block, following the different uplink transmission, that is in a same slot as the different uplink transmission.

In a seventh aspect, alone or in combination with one or more of the first through sixth aspects, the other portion of the coded bits corresponding to the transport block is a remaining portion of the coded bits corresponding to the transport block following the different uplink transmission.

In an eighth aspect, alone or in combination with one or more of the first through seventh aspects, receiving at least the portion of the coded bits corresponding to the transport block includes receiving the different uplink transmission without receiving another portion of the coded bits corresponding to the transport block that overlaps with the different uplink transmission.

In a ninth aspect, alone or in combination with one or more of the first through eighth aspects, the uplink transmission of the transport block over the multiple slots and the different uplink transmission are separated by a time gap.

In a tenth aspect, alone or in combination with one or more of the first through ninth aspects, a duration of the time gap is based at least in part on at least one of a sub-carrier spacing associated with the uplink transmission of the transport block over the multiple slots or a sub-carrier spacing associated with the different uplink transmission.

In an eleventh aspect, alone or in combination with one or more of the first through tenth aspects, the time gap has a fixed duration.

In a twelfth aspect, alone or in combination with one or more of the first through eleventh aspects, process 1000 includes transmitting (e.g., using transmission component 1204, depicted in FIG. 12) information identifying a duration for the time gap.

In a thirteenth aspect, alone or in combination with one or more of the first through twelfth aspects, a duration of the time gap is based at least in part on a capability of the UE.

In a fourteenth aspect, alone or in combination with one or more of the first through thirteenth aspects, receiving at least the portion of the coded bits corresponding to the transport block includes receiving a first portion of the coded bits corresponding to the transport block before the different uplink transmission and a second portion of the coded bits corresponding to the transport block after the different uplink transmission without phase continuity of the first portion and the second portion.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
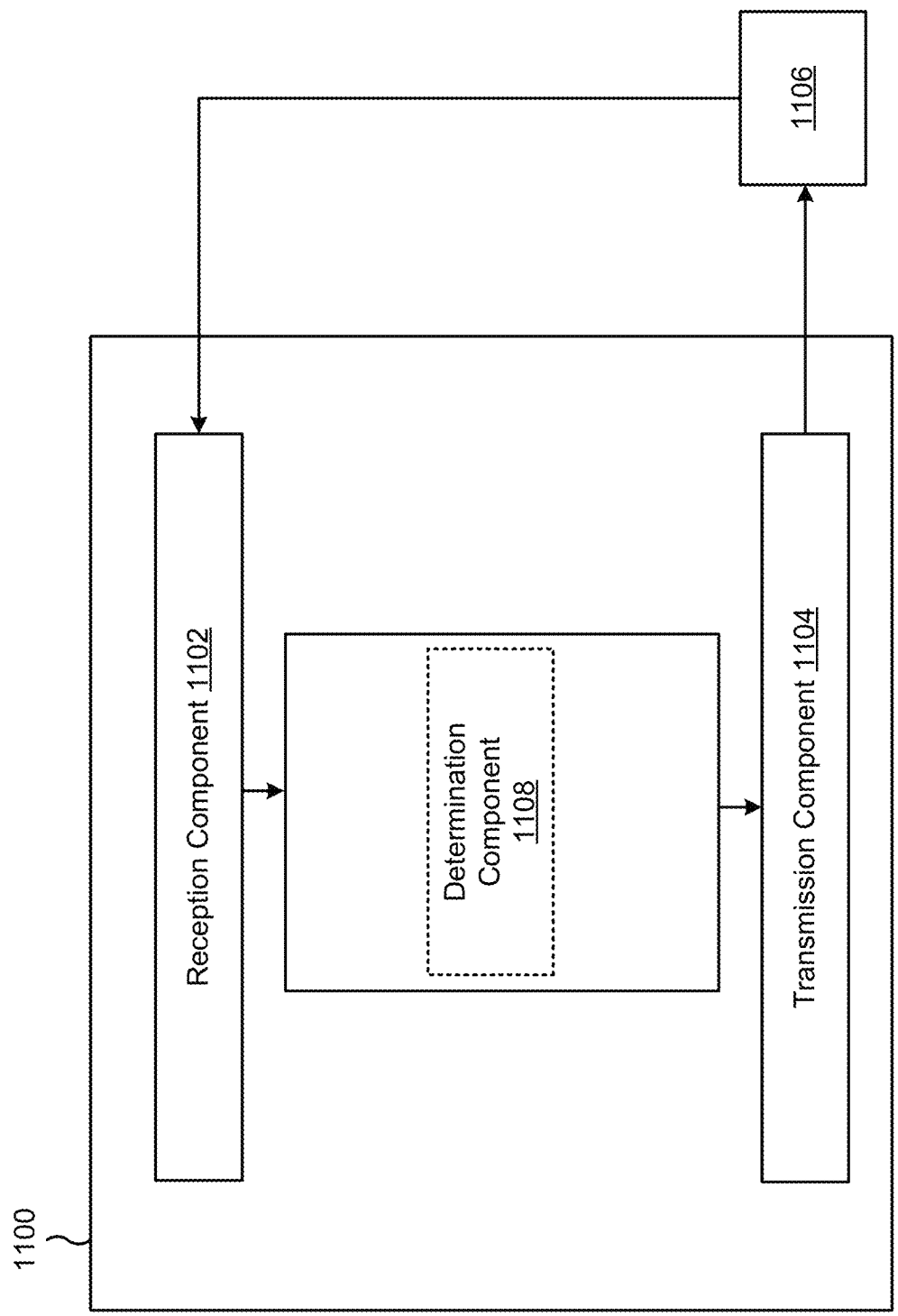
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive, from a base station, information identifying a resource allocation for an uplink transmission of a transport block over multiple slots. The transmission component 1104 may transmit, to the base station, at least a portion of coded bits corresponding to the transport block based at least in part on a different uplink transmission being scheduled within the uplink transmission of the transport block over the multiple slots. The transmission component 1104 may encode the transport block to obtain the coded bits.

The determination component 1108 may determine a transport block size based at least in part on the resource allocation. The determination component 1108 may determine a configuration error associated with the different uplink transmission being scheduled within the uplink transmission of the transport block over the multiple slots. The determination component 1108 may determine whether to transmit the different uplink transmission scheduled within the uplink transmission of the transport block over the multiple slots. The determination component 1108 may determine whether to transmit another portion of the coded bits corresponding to the transport block. In some aspects, the determination component 1108 may include one a controller/processor, a memory, or a combination thereof, of the UE described above in connection with FIG. 2.

The transmission component 1104 may transmit capability information indicating whether the UE supports transmitting the different uplink transmission within the uplink transmission of the transport block over the multiple slots. The reception component 1102 may receive information identifying a duration for a time gap.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
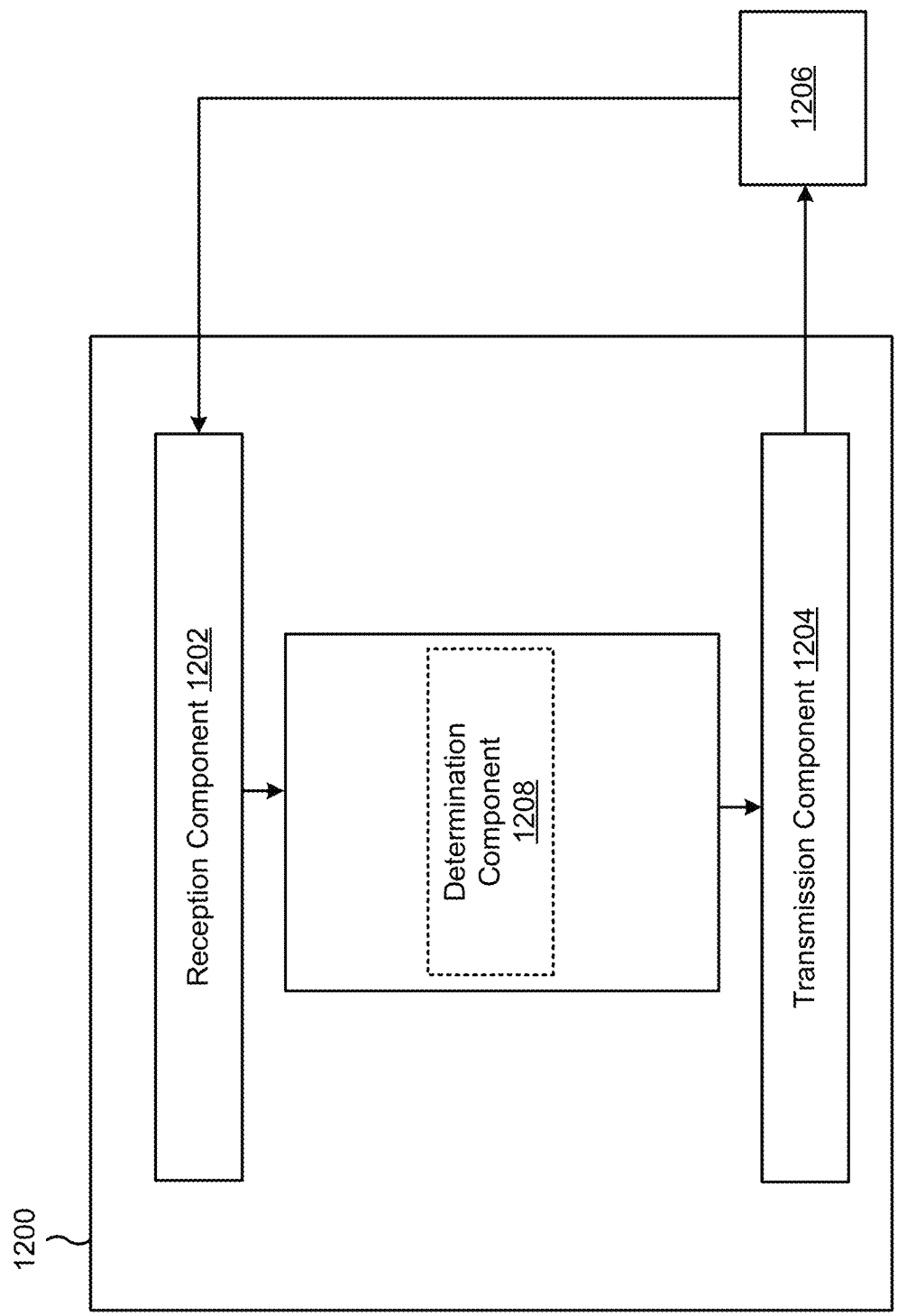

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit, to a UE, information identifying a resource allocation for an uplink transmission of a transport block over multiple slots. The reception component 1202 may receive, from the UE, at least a portion of coded bits corresponding to the transport block based at least in part on a different uplink transmission being scheduled within the uplink transmission of the transport block over the multiple slots. The reception component 1202 may decode the portion of the coded bits corresponding to the transport block.

The determination component 1208 may determine the resource allocation for the uplink transmission of the transport block over multiple slots. The determination component 1208 may determine a transport block size based at least in part on the resource allocation. The determination component 1208 may determine a configuration error associated with the different uplink transmission being scheduled within the uplink transmission of the transport block over the multiple slots.

The reception component 1202 may receive capability information indicating whether the UE supports transmitting the different uplink transmission within the uplink transmission of the transport block over the multiple slots. The transmission component 1204 may transmit information identifying a duration for a time gap.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, information identifying a resource allocation for an uplink transmission of a transport block over multiple slots; and transmitting, to the base station, at least a portion of coded bits corresponding to the transport block based at least in part on a different uplink transmission being scheduled within the uplink transmission of the transport block over the multiple slots.

Aspect 2: The method of Aspect 1, further comprising: determining a transport block size based at least in part on the resource allocation; and encoding the transport block based at least in part on the transport block size.

Aspect 3: The method of any of Aspects 1-2, further comprising: transmitting capability information indicating whether the UE supports transmitting the different uplink transmission within the uplink transmission of the transport block over the multiple slots.

Aspect 4: The method of Aspect 3, wherein the capability information indicates, per frequency band, whether the UE supports transmitting the different uplink transmission within the uplink transmission of the transport block over the multiple slots.

Aspect 5: The method of any of Aspects 1-4, wherein the different uplink transmission being scheduled within the uplink transmission of the transport block over the multiple slots results in a configuration error.

Aspect 6: The method of any of Aspects 1-4, wherein transmitting at least the portion of the coded bits corresponding to the transport block comprises: transmitting the coded bits corresponding to the transport block over the multiple slots and refraining from transmitting the different uplink transmission.

Aspect 7: The method of any of Aspects 1-4, wherein transmitting at least the portion of the coded bits corresponding to the transport block comprises: transmitting the different uplink transmission and refraining from transmitting another portion of the coded bits corresponding to the transport block.

Aspect 8: The method of Aspect 7, wherein the other portion of the coded bits corresponding to the transport block is a remaining portion of the coded bits corresponding to the transport block, following the different uplink transmission, that is in a same slot as the different uplink transmission.

Aspect 9: The method of Aspect 7, wherein the other portion of the coded bits corresponding to the transport block is a remaining portion of the coded bits corresponding to the transport block following the different uplink transmission.

Aspect 10: The method of any of Aspects 1-4, wherein transmitting at least the portion of the coded bits corresponding to the transport block comprises: transmitting the different uplink transmission and refraining from transmitting another portion of the coded bits corresponding to the transport block that overlaps with the different uplink transmission.

Aspect 11: The method of any of Aspects 1-4, wherein the uplink transmission of the transport block over the multiple slots and the different uplink transmission are separated by a time gap.

Aspect 12: The method of Aspect 11, wherein a duration of the time gap is based at least in part on at least one of a sub-carrier spacing associated with the uplink transmission of the transport block over the multiple slots or a sub-carrier spacing associated with the different uplink transmission.

Aspect 13: The method of Aspect 11, wherein the time gap has a fixed duration.

Aspect 14: The method of Aspect 11, further comprising: receiving information identifying a duration for the time gap.

Aspect 15: The method of Aspect 11, wherein a duration of the time gap is based at least in part on a capability of the UE.

Aspect 16: The method of any of Aspects 1-4 or 11-15, wherein transmitting at least the portion of the coded bits corresponding to the transport block comprises: transmitting a first portion of the coded bits corresponding to the transport block before the different uplink transmission and a second portion of the coded bits corresponding to the transport block after the different uplink transmission without phase continuity of the first portion and the second portion.

Aspect 17: A method of wireless communication performed by a base station, comprising: transmitting, to a user equipment (UE), information identifying a resource allocation for an uplink transmission of a transport block over multiple slots; and receiving, from the UE, at least a portion of coded bits corresponding to the transport block based at least in part on a different uplink transmission being scheduled within the uplink transmission of the transport block over the multiple slots.

Aspect 18: The method of Aspect 17, further comprising: receiving capability information indicating whether the UE supports transmitting the different uplink transmission within the uplink transmission of the transport block over the multiple slots.

Aspect 19: The method of Aspect 18, wherein the capability information indicates, per frequency band, whether the UE supports transmitting the different uplink transmission within the uplink transmission of the transport block over the multiple slots.

Aspect 20: The method of any of Aspects 17-19, wherein the different uplink transmission being scheduled within the uplink transmission of the transport block over the multiple slots results in a configuration error.

Aspect 21: The method of any of Aspects 17-19, wherein receiving at least the portion of the coded bits corresponding to the transport block comprises: receiving the coded bits corresponding to the transport block over the multiple slots without receiving the different uplink transmission.

Aspect 22: The method of any of Aspects 17-19, wherein receiving at least the portion of the coded bits corresponding to the transport block comprises: receiving the different uplink transmission without receiving another portion of the coded bits corresponding to the transport block.

Aspect 23: The method of Aspect 22, wherein the other portion of the coded bits corresponding to the transport block is a remaining portion of the coded bits corresponding to the transport block, following the different uplink transmission, that is in a same slot as the different uplink transmission.

Aspect 24: The method of Aspect 22, wherein the other portion of the coded bits corresponding to the transport block is a remaining portion of the coded bits corresponding to the transport block following the different uplink transmission.

Aspect 25: The method of any of Aspects 17-19, wherein receiving at least the portion of the coded bits corresponding to the transport block comprises: receiving the different uplink transmission without receiving another portion of the coded bits corresponding to the transport block that overlaps with the different uplink transmission.

Aspect 26: The method of any of Aspects 17-19, wherein the uplink transmission of the transport block over the multiple slots and the different uplink transmission are separated by a time gap.

Aspect 27: The method of Aspect 26, wherein a duration of the time gap is based at least in part on at least one of a sub-carrier spacing associated with the uplink transmission of the transport block over the multiple slots or a sub-carrier spacing associated with the different uplink transmission.

Aspect 28: The method of Aspect 26, wherein the time gap has a fixed duration.

Aspect 29: The method of Aspect 26, further comprising: transmitting information identifying a duration for the time gap.

Aspect 30: The method of Aspect 26, wherein a duration of the time gap is based at least in part on a capability of the UE.

Aspect 31: The method of any of Aspects 17-19 or 26-30, wherein receiving at least the portion of the coded bits corresponding to the transport block comprises: receiving a first portion of the coded bits corresponding to the transport block before the different uplink transmission and a second portion of the coded bits corresponding to the transport block after the different uplink transmission without phase continuity of the first portion and the second portion.

Aspect 32: An apparatus for wireless communication at a device, comprising a processor; memory coupled with the processor; and instructions stored in the memory and executable by the processor to cause the apparatus to perform the method of one or more Aspects of Aspects 1-16.

Aspect 33: A device for wireless communication, comprising a memory and one or more processors coupled to the memory, the memory and the one or more processors configured to perform the method of one or more Aspects of Aspects 1-16.

Aspect 34: An apparatus for wireless communication, comprising at least one means for performing the method of one or more Aspects of Aspects 1-16.

Aspect 35: A non-transitory computer-readable medium storing code for wireless communication, the code comprising instructions executable by a processor to perform the method of one or more Aspects of Aspects 1-16.

Aspect 36: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 37: An apparatus for wireless communication at a device, comprising a processor; memory coupled with the processor; and instructions stored in the memory and executable by the processor to cause the apparatus to perform the method of one or more Aspects of Aspects 17-31.

Aspect 38: A device for wireless communication, comprising a memory and one or more processors coupled to the memory, the memory and the one or more processors configured to perform the method of one or more Aspects of Aspects 17-31.

Aspect 39: An apparatus for wireless communication, comprising at least one means for performing the method of one or more Aspects of Aspects 17-31.

Aspect 40: A non-transitory computer-readable medium storing code for wireless communication, the code comprising instructions executable by a processor to perform the method of one or more Aspects of Aspects 17-31.

Aspect 41: A non-transitory computer-readable medium storing a set of instructions for wireless communication, the set of instructions comprising one or more instructions that, when executed by one or more processors of a device, cause the device to perform the method of one or more Aspects of Aspects 17-31.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit, to a network node, capability information indicating whether the UE supports transmitting a different uplink transmission within an uplink transmission of a transport block over multiple slots;

receive, from the network node, information identifying a resource allocation for the uplink transmission of the transport block over the multiple slots; and
transmit, to the network node, a first portion of coded bits, corresponding to the transport block and less than an entire portion of the coded bits, or the entire portion of the coded bits based at least in part on:
the different uplink transmission being scheduled within the uplink transmission of the transport block over the multiple slots, and
the capability information.

2. The UE of claim 1, wherein the one or more processors are further configured to:
determine a transport block size based at least in part on the resource allocation; and
encode the transport block based at least in part on the transport block size.

3. The UE of claim 1, wherein the capability information indicates, per frequency band, whether the UE supports transmitting the different uplink transmission within the uplink transmission of the transport block over the multiple slots.

4. The UE of claim 1, wherein the different uplink transmission being scheduled within the uplink transmission of the transport block over the multiple slots results in a configuration error.

5. The UE of claim 1, wherein the one or more processors, to transmit the first portion of the coded bits or the entire portion of the coded bits, are configured to:
transmit the entire portion of the coded bits over the multiple slots; and
refrain from transmitting the different uplink transmission.

6. The UE of claim 1, wherein the one or more processors, to transmit the first portion of the coded bits or the entire portion of the coded bits, are configured to:
transmit the first portion of the coded bits and the different uplink transmission; and
refrain from transmitting another portion of the coded bits.

7. The UE of claim 6, wherein the other portion of the coded bits is a remaining portion of the coded bits, following the different uplink transmission, that is in a same slot as the different uplink transmission.

8. The UE of claim 6, wherein the other portion of the coded bits is a remaining portion of the coded bits following the different uplink transmission.

9. The UE of claim 6, wherein the other portion of the coded bits overlaps with the different uplink transmission.

10. The UE of claim 1, wherein the uplink transmission of the transport block over the multiple slots and the different uplink transmission are separated by a time gap.

11. The UE of claim 10, wherein a duration of the time gap is based at least in part on at least one of a sub-carrier spacing associated with the uplink transmission of the transport block over the multiple slots or a sub-carrier spacing associated with the different uplink transmission.

12. The UE of claim 10, wherein the time gap has a fixed duration.

13. The UE of claim 10, wherein the one or more processors are further configured to:
receive information identifying a duration for the time gap.

14. The UE of claim 10, wherein a duration of the time gap is based at least in part on a capability of the UE.

15. The UE of claim 1, wherein the one or more processors, to transmit the first portion of the coded bits or the entire portion of the coded bits, are configured to:
transmit the first portion of the coded bits before the different uplink transmission and a second portion of the coded bits after the different uplink transmission without phase continuity of the first portion and the second portion.

16. The UE of claim 1, wherein the first portion of coded bits or the entire portion of coded bits is transmitted further based at least in part on a priority associated with the different uplink transmission.

17. A network node for wireless communication, comprising:
a memory; and
one or more processors, coupled to the memory, configured to:
receive, from a user equipment (UE), capability information indicating whether the UE supports transmitting a different uplink transmission within an uplink transmission of a transport block over multiple slots;
transmit, to the UE, information identifying a resource allocation for the uplink transmission of the transport block over the multiple slots; and
receive, from the UE, a first portion of coded bits, corresponding to the transport block and less than an entire portion of the coded bits, or the entire portion of the coded bits based at least in part on:
the different uplink transmission being scheduled within the uplink transmission of the transport block over the multiple slots, and
the capability information.

18. The network node of claim 17, wherein the different uplink transmission being scheduled within the uplink transmission of the transport block over the multiple slots results in a configuration error.

19. The network node of claim 17, wherein the one or more processors, to receive the first portion of the coded bits or the entire portion of the coded bits, are configured to:
receive the entire portion of the coded bits block over the multiple slots without receiving the different uplink transmission.

20. The network node of claim 17, wherein the one or more processors, to receive the first portion of the coded bits or the entire portion of the coded bits, are configured to:
receive the first portion of the coded bits and the different uplink transmission without receiving another portion of the coded bits.

21. The network node of claim 20, wherein the other portion of the coded bits is a remaining portion of the coded bits, following the different uplink transmission, that is in a same slot as the different uplink transmission.

22. The network node of claim 20, wherein the other portion of the coded bits is a remaining portion of the coded bits following the different uplink transmission.

23. The network node of claim 20, wherein the other portion of the coded bits overlaps with the different uplink transmission.

24. The network node of claim 17, wherein the uplink transmission of the transport block over the multiple slots and the different uplink transmission are separated by a time gap.

25. The network node of claim 17, wherein the one or more processors, to receive the first portion of the coded bits or the entire portion of the coded bits, are configured to:
receive the first portion of the coded bits before the different uplink transmission and a second portion of the coded bits after the different uplink transmission without phase continuity of the first portion and the second portion.

26. The network node of claim 17, wherein the first portion of coded bits or the entire portion of coded bits is received further based at least in part on a priority associated with the different uplink transmission.

27. A method of wireless communication performed by a user equipment (UE), comprising:
- transmitting, to a network node, capability information indicating whether the UE supports transmitting a different uplink transmission within an uplink transmission of a transport block over multiple slots;
- receiving, from the network node, information identifying a resource allocation for the uplink transmission of the transport block over the multiple slots; and
- transmitting, to the network node, a first portion of coded bits, corresponding to the transport block and less than an entire portion of the coded bits, or the entire portion of the coded bits based at least in part on:
  - the different uplink transmission being scheduled within the uplink transmission of the transport block over the multiple slots, and
  - the capability information.

28. The method of claim 27, wherein the first portion of coded bits or the entire portion of coded bits is transmitted further based at least in part on a priority associated with the different uplink transmission.

29. A method of wireless communication performed by a network node, comprising:
- receiving, from a user equipment (UE), capability information indicating whether the UE supports transmitting a different uplink transmission within an uplink transmission of a transport block over multiple slots;
- transmitting, to the UE, information identifying a resource allocation for the uplink transmission of a transport block over multiple slots; and
- receiving, from the UE, a first portion of coded bits, corresponding to the transport block and less than an entire portion of the coded bits, or the entire portion of the coded bits based at least in part on:
  - the different uplink transmission being scheduled within the uplink transmission of the transport block over the multiple slots, and
  - the capability information.

30. The method of claim 29, wherein the first portion of coded bits or the entire portion of coded bits is received further based at least in part on a priority associated with the different uplink transmission.

\* \* \* \* \*